(12) United States Patent
Hirvonen

(10) Patent No.: US 10,723,473 B2
(45) Date of Patent: Jul. 28, 2020

(54) METHOD FOR DYNAMIC COMMAND LIMITING IN A DISTRIBUTED CONTROL SYSTEM

(71) Applicant: Honda Patents & Technologies North America, LLC, Torrance, CA (US)

(72) Inventor: Jukka Matti Hirvonen, Oak Ridge, NC (US)

(73) Assignee: HONDA PATENTS & TECHNOLOGIES NORTH AMERICA, LLC, Torrance, CA (US)

( * ) Notice: Subject to any disclaimer, the term of this patent is extended or adjusted under 35 U.S.C. 154(b) by 0 days.

(21) Appl. No.: 15/780,665

(22) PCT Filed: Dec. 1, 2016

(86) PCT No.: PCT/US2016/064337
§ 371 (c)(1),
(2) Date: Jun. 1, 2018

(87) PCT Pub. No.: WO2017/095992
PCT Pub. Date: Jun. 8, 2017

(65) Prior Publication Data
US 2018/0362176 A1    Dec. 20, 2018

Related U.S. Application Data

(60) Provisional application No. 62/262,474, filed on Dec. 3, 2015.

(51) Int. Cl.
*B64D 31/08* (2006.01)
*B64D 31/12* (2006.01)
*B64C 13/00* (2006.01)

(52) U.S. Cl.
CPC .............. *B64D 31/08* (2013.01); *B64D 31/12* (2013.01); *B64C 13/00* (2013.01)

(58) Field of Classification Search
CPC .......... B64D 31/08; B64D 31/12; B64C 13/00
See application file for complete search history.

(56) References Cited

U.S. PATENT DOCUMENTS

| | | | |
|---|---|---|---|
| 3,744,932 A | 7/1973 | Prevett | |
| 8,352,099 B1* | 1/2013 | Eggold | .................. B64C 15/02 244/75.1 |
| 8,688,353 B2 | 4/2014 | Morimoto et al. | |
| (Continued) | | | |

OTHER PUBLICATIONS

Written Opinion and International Search Report of PCT/US2016/064337 dated Feb. 21, 2017; 7 pages.

(Continued)

*Primary Examiner* — Rodney A Butler
(74) *Attorney, Agent, or Firm* — Rankin, Hill & Clark LLP

(57) ABSTRACT

According to one or more aspects, a control system for managing operational limits associated with two or more actuators includes a controller. The controller may continually monitor a first operational limit associated with a first actuator and a first operational limit associated with a second actuator. The controller may determine a first overall distributed control system operating limit based on the first operational limit associated with the first actuator, the first operational limit associated with the second actuator, and a type of operational limit associated with both operational limits.

14 Claims, 2 Drawing Sheets

(56) References Cited

U.S. PATENT DOCUMENTS

| | | | |
|---|---|---|---|
| 2007/0157896 A1* | 7/2007 | Fuwa | F01L 1/185 |
| | | | 123/90.16 |
| 2008/0275597 A1 | 11/2008 | Gaulmin et al. | |
| 2009/0308603 A1* | 12/2009 | Borgstadt | B25J 9/1664 |
| | | | 166/250.15 |
| 2013/0015787 A1 | 1/2013 | Devos et al. | |
| 2014/0283527 A1 | 9/2014 | Ling et al. | |

OTHER PUBLICATIONS

Extended European Search Report of EP 16871470.7 dated Sep. 5, 2018, 8 pages.

* cited by examiner

METHOD FOR DYNAMIC COMMAND LIMITING IN A DISTRIBUTED CONTROL SYSTEM

BACKGROUND

In a typical cruise speed control (CSC) system of a modern advanced light jet aircraft, a full authority digital engine control (FADEC) unit (also referred to as an engine control unit (ECU)) modulates the engine fuel flow, by controlling the throttle position, to substantially maintain the flight speed constant. A challenge of the CSC system is that it has to operate within many boundaries as opposed to a full authority auto-throttle system that can be found in modern higher end aircraft. The CSC system is generally designed to operate in conjunction with an engine synchronization (SYNC) function, which has a very limited authority band relative to the overall authority of the actuation, in this case, engine thrust.

For example, the SYNC function can have an authority deviation of a few percent of the engine speed (N1) command. On the other hand, the SYNC function may not be available in the full cockpit throttle range, but rather, in a limited throttle/thrust lever angle (TLA). In addition, because each engine can be designed to maintain their independence even during the SYNC function operation and the cockpit controls of each engine are independent, the reference point for the command limiting in each engine can be different (asymmetric in case of a twin engine aircraft). And when another function, like the CSC system function is added to the engine control, it can have its own safety and/or authority limits. When all these different system/function limits are globally considered and when each of the limits has to be continuously obeyed during operation, a complex scenario can occur as to how to simultaneously coordinate and operate within the differing limits.

BRIEF DESCRIPTION

According to one or more aspects, a control system for managing operational limits associated with two or more actuators includes a controller. The controller may continually monitor a first operational limit associated with a first actuator and a first operational limit associated with a second actuator. The controller may determine a first overall distributed control system operating limit based on the first operational limit associated with the first actuator, the first operational limit associated with the second actuator, and a type of operational limit associated with both operational limits.

The type of operational limit may be an upper limit or a lower limit. One or more of the operational limits may be associated with an exhaust gas temperature (EGT), a throttle/thrust lever angle (TLA), or an engine speed (N1). The controller may dynamically adjust the first overall distributed control system operating limit based on updated first operational limits associated with the respective first and second actuators. The controller may implement the first operational limit associated with the first actuator for the second actuator based on the first actuator reaching its first operational limit. The controller may implement the first operational limit associated with the second actuator for the first actuator based on the second actuator reaching its first operational limit.

According to one or more aspects, a method for managing operational limits associated with two or more actuators includes monitoring an upper operational limit associated with a first actuator, monitoring an upper operational limit associated with a second actuator, monitoring a lower operational limit associated with the first actuator, monitoring a lower operational limit associated with the second actuator, determining one or more system operating limits based on the upper and lower operational limits of the respective first and second actuators, implementing one or more of the system operating limits for the first actuator and the second actuator based on the first actuator or the second actuator reaching their respective upper operational or lower operational limits.

One or more of the upper or lower operational limits may be associated with the first or second actuator are operational limits associated with an exhaust gas temperature (EGT), a throttle/thrust lever angle (TLA), or an engine speed (N1). Further, the method may include dynamically adjusting one or more of the system operating limits based on receiving updated upper or lower operational limits associated with the respective first and second actuators, implementing the upper operational limit associated with the first actuator as the upper operational limit for the second actuator based on the first actuator reaching its upper operational limit, implementing the upper operational limit associated with the second actuator as the upper operational limit for the first actuator based on the second actuator reaching its upper operational limit, implementing the lower operational limit associated with the first actuator as the lower operational limit for the second actuator based on the first actuator reaching its lower operational limit, or implementing the lower operational limit associated with the second actuator as the lower operational limit for the first actuator based on the second actuator reaching its lower operational limit.

According to one or more aspects, a control system for managing operational limits associated with two or more actuators may include a controller. The controller may continually monitor an upper operational limit associated with a first actuator, an upper operational limit associated with a second actuator, a lower operational limit associated with the first actuator, and a lower operational limit associated with the second actuator. The controller may determine one or more system operating limits based on the upper and lower operational limits of the respective first and second actuators.

DETAILED DESCRIPTION

Figure 1:
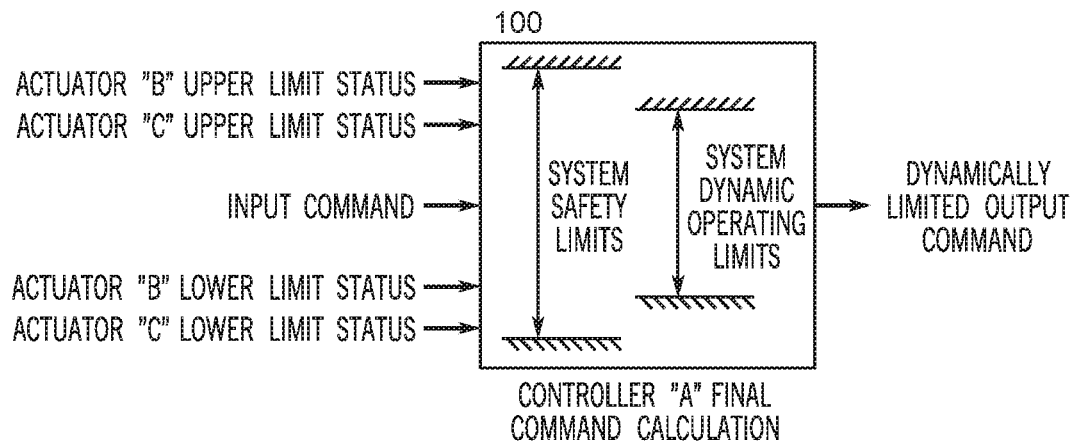
FIG. 1 is a view of an exemplary centralized controller dynamic command limiting based on a distributed actuation system limit status according to the present disclosure.

As used herein, a logic, a control logic, a component, a function, an algorithm, a module, etc. refers to an implementation of one or more computer instructions, calculations, or determinations, via a processor, a microprocessor, a processing unit, and/or a memory of a computer or other electronic hardware, such as circuitry, a hardware controller, a field programmable gate array (FPGA), or an integrated circuit (IC), for example.

The present disclosure addresses the concern of simultaneously and continuously obeying one or more different, dissimilar, and potentially asymmetric limits during control system operation, while maintaining the independence of each of the distributed control system components.

The present disclosure relates to dynamic command limiting in a distributed control system (also referred to as a "smart" actuation system), which can occur in the presence of dissimilar and asymmetric control limits. As used herein, a distributed control system is a system that implements control logic distributed across several components that can be physically separated and can also serve separate functions as part of a larger control system. The present disclosure may be implemented as a method in a dynamic manner to provide integrator (or control system) wind up protection, taking into account multiple sources of operational limits, and combining the operational limits or command limits into a command that stops the control integrator from integrating (e.g., winding up). According to one or more aspects, the method is based on a final control system command that is a value of an integrator. The limits where the integrator stops integrating, either up or down, and is dynamic instead of static (e.g., predetermined). In other words, these limits will be dynamically adjusted based on how the control system is configured for a given moment.

While an exemplary method is described herein as being applied to a cruise speed control (CSC) system, it will be appreciated that the present method can be applied to other distributed control systems, such as a flight control system with various actuation and surface position limits or any other control system.

In one or more embodiments, an exemplary method for dynamic command limiting is based on a distributed control system, where the control of each individual actuator (e.g., engine) is localized (e.g., in the case of a modern jet engine, local control of the engine is typically provided by a FADEC unit for that engine). It will appreciated that there can be multiple of these actuators and each of the actuators can have its own output limits (e.g., rate or position, or for an engine, TLA or N1 command limits). Therefore, a distributed control system for each actuator continuously computes limits for that actuator and different limits can be active at different times for a given actuator (e.g., the engine can be limited by N1%, exhaust gas temperature (EGT), or TLA on the input side for a given mode).

Further, because independence should be continuously maintained between, for example, the left and right engines in a twin engine aircraft (operation of one engine not affecting operation of the other engine) for safety reasons and the input side can be controlled by a pilot, it is not only possible, but likely that the two engines are not using the same operating parameters (e.g., operational limits), but rather, small variations between the two engines are to be expected. Due to these operational differences between the two engines, many aircraft include an SYNC function to match parameters (e.g., N1 of each engine). In order to maintain the independence between the two engines and safety of such function, the SYNC function is often limited relative to the overall power/thrust range of an engine. Then, when a function like the CSC system (which can be hosted as part of the overall centralized Automatic Flight Control System (AFCS)) is integrated into the engine control and when based on the operation of the SYNC function, the CSC system may be provided with its own operational limits and be within the SYNC function operational limits all at the same time.

The exemplary method provides a simple and yet effective way to control multiple simultaneous operational limits that can be dissimilar to each other or asymmetric from side to side. According to one or more aspects, each actuation system (e.g., engine system) continuously computes one or more operating limits which can be control mode specific (e.g., a limit applicable to a SYNC function mode). Described with reference to an aircraft main control system (i.e., controller "A" 100 of FIGS. 1 and 2, such as the CSC system as a sub-function of the AFCS), upper and/or lower limits of an engine (e.g., actuator "B" 110 and actuator "C" 120 in FIGS. 1 and 2) in a certain operating mode (e.g., the SYNC function mode, the CSC function mode, or a combination thereof) are reported to the main control system. Because each engine control independently computes its own upper and/or lower operational limits, and that data is generally not shared between the engines but instead is provided to the main control system, the end result is that the main control system (in this example, the CSC system) will continuously obey each of the differing operational limits without affecting the independence of each engine functions and this, in turn, provides a smooth system operation.

Figure 2:
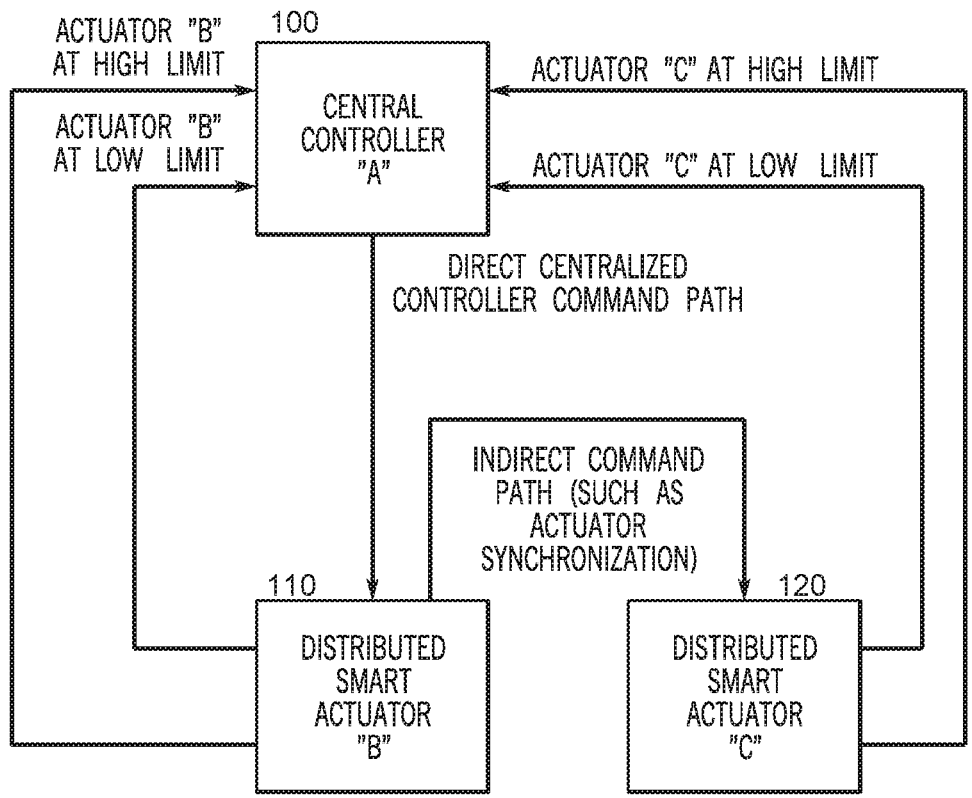
FIG. 2 is a view of an exemplary distributed control system limit feedback according to the present disclosure.
Figure 3:
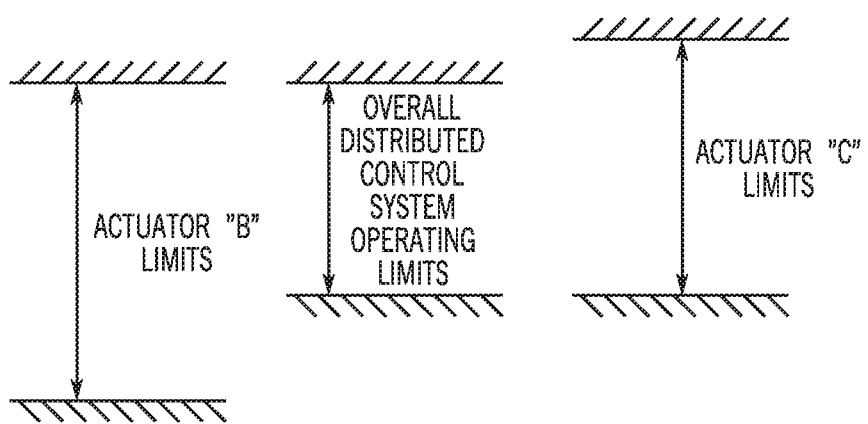
FIG. 3 is a view of individual system component limits determining the final control system dynamic operating limits according to the present disclosure.

Additionally, the present method ensures that the main control system will not drive the engines into an asymmetric thrust condition where one engine is at its operational limit while the other engine could allow for more commands in that direction. As illustrated in FIGS. 1 and 2, because each engine (e.g., actuators 110 and 120) continuously communicates its operational status to the main control system (e.g., controller 100) as either a lower limit or upper limit, according to the present method, the main control system ceases its internal command for one or more of the engines as soon as the first of these limits is encountered during operation. In this way, the controller 100 enables the CSC system to obey multiple control system limits simultaneously, or in a concurrent fashion, while maintaining the ability to adjust the system limits on the fly. An architectural view of the exemplary is indicated in FIG. 2, and resulting overall dynamic command limits of the aircraft level function are shown in FIG. 3.

Regarding the exemplary method implemented into a CSC system described above, the CSC system includes two centralized computing platforms that compute the actual speed control and two engines that control the thrust. Therefore, the CSC system is operable to send a command to each engine in order to achieve or maintain the target airspeed. The engines will respond to these commands and change their thrust equivalently. However, the engines can have different upper and lower operational limits. These operational limits can vary over time depending on external conditions and may be different from side to side (left to right). In order to avoid any asymmetry in the thrust of the two engines, according to the present method, the CSC system is operable to consider the operational limits from both engines. The method continuously takes into account the different operational limits and prevents both integrator wind up and also any asymmetric commands between the left and right engines.

By way of example, one engine (e.g., a first engine) may have achieved its N1 limit allowed for a given mode/condition of operation while the other engine (e.g., a second engine) may have not yet reached its limit. According to the present method, the main control system may stop any further command to one or more of the engines (e.g., the first engine, the second engine, or both engines) based on one or more of the engines reaching its associated operational limit, because it would result in an asymmetric situation between the two engines.

In one or more embodiments, the controller 100 may implement a first operational limit associated with a first actuator for a second actuator based on the first actuator reaching its first operational limit. Conversely, the controller 100 may implement the first operational limit associated with the second actuator for the first actuator based on the second actuator reaching its first operational limit.

As another example, a control system for managing operational limits associated with two or more actuators may include a controller which continually monitors a first operational limit associated with a first actuator and a first operational limit associated with a second actuator. These operational limits may be upper or lower limits. In other words, the type of operational limit may be an upper limit or a lower limit. The controller may determine a first overall distributed control system operating limit based on the first operational limit associated with the first actuator, the first operational limit associated with the second actuator, and the type of operational limit associated with both operational limits. With reference to FIG. 3, it can be seen that the upper limit for actuator "B" and the upper limit for actuator "C" are used by the controller to determine an overall distributed control system upper operating limit, in the center of FIG. 3. Because the first operational limit associated with the first actuator and the first operational limit associated with the second actuator are of the upper limit type in this example, the controller 100 determined the overall distributed control system upper operating limit using the tighter of the two limits.

More particularly, the control system, controller, or main control system may monitor an upper operational limit associated with a first actuator, an upper operational limit associated with a second actuator, a lower operational limit associated with the first actuator, and a lower operational limit associated with the second actuator. The controller 100 may determine one or more system operating limits based on the upper and lower operational limits of the first and second actuators and implement one or more of the system operating limits for the first actuator and the second actuator based on the first actuator or the second actuator reaching their respective upper operational or lower operational limits. In this way, the CSC system or the controller 100 is capable of considering or accounting for the operational limits from both engines or actuators.

It will be appreciated that the present method is not limited to engine/thrust control, but can be applied to any control system, such as aerodynamic surface control via actuators. Thus, the operational limits may be associated with different aspects of operation, such as an exhaust gas temperature (EGT), a throttle/thrust lever angle (TLA), or an engine speed (N1), rate limits, position limits, amplitude limits, etc.

The controller 100 may dynamically adjust the first overall distributed control system operating limit based on updated first operational limits associated with the first and second actuators (e.g., actuator "B" 110 and actuator "C" 120). Thus, the limits are not required to be hard coded or predetermined during the system design phase.

The present method simultaneously considers multiple or different operational limits that affect the overall control system. The control system relies on the command limit reporting of the different control system components and those limits are applied in real-time to the final command signal output of the control system. The method can be applied in a distributed control system, e.g., where the overall control system logic and algorithms are distributed across multiple components of the overall control system. Often this functionality is implemented in software that is executed by a microprocessor (e.g., inside different line replaceable units (LRUs)).

Accordingly, the present method prevents integrator wind up; simultaneously conforms to multiple control system limits; prevents asymmetric actuation if two actuators (e.g., actuators 110 and 120) are used on each side of a symmetry line of a vehicle/aircraft; applies dynamic limits; tolerates changes in the overall system limits in real-time; does not require all the system limits to be known during the design phase, instead the limits can be reported by the distributed components of the control system in real-time; and is based on the fact that the limits of control system are reported by the actuation system back to the main control system, which in turn follows the limits of plurality of the actuation systems.

It will be appreciated that the above-disclosed and other features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A control system for managing operational limits associated with two or more actuators, comprising:
a controller continually monitoring:
a first operational limit associated with a first actuator; and
a first operational limit associated with a second actuator; and
wherein the controller determines a first overall distributed control system operating limit based on the first operational limit associated with the first actuator, the first operational limit associated with the second actuator, and a type of operational limit associated with both operational limits, wherein the controller implements the first overall distributed control system operating limit in the first actuator and in the second actuator in a manner where asymmetric operation is prohibited once the first overall distributed control system operating limit is reached.

2. The system of claim 1, wherein the type of operational limit is an upper limit or a lower limit.

3. The system of claim 1, wherein both the operational limits are associated with an exhaust gas temperature (EGT), a throttle/thrust lever angle (TLA), or an engine speed (N1).

4. The system of claim 1, wherein the controller dynamically adjusts the first overall distributed control system operating limit based on updated first operational limits associated with the respective first and second actuators.

5. The system of claim 1, wherein the controller implements the first operational limit associated with the first actuator for the second actuator based on the first actuator reaching its first operational limit.

6. The system of claim 1, wherein the controller implements the first operational limit associated with the second actuator for the first actuator based on the second actuator reaching its first operational limit.

7. A method for managing operational limits associated with two or more actuators, comprising:
monitoring an upper operational limit associated with a first actuator;
monitoring an upper operational limit associated with a second actuator;

monitoring a lower operational limit associated with the first actuator;
monitoring a lower operational limit associated with the second actuator;
determining one or more system operating limits based on the upper and lower operational limits of the respective first and second actuators; and
implementing one or more of the system operating limits for the first actuator and the second actuator based on the first actuator or the second actuator reaching their respective upper operational or lower operational limits in a manner where asymmetric operation of the first actuator and the second actuator is prohibited once one or more of the system operating limits is reached.

8. The method of claim 7, wherein at least one of the upper or lower operational limits associated with the first or second actuator are operational limits associated with an exhaust gas temperature (EGT), a throttle/thrust lever angle (TLA), or an engine speed (N1).

9. The method of claim 7, comprising dynamically adjusting one or more of the system operating limits based on receiving updated upper or lower operational limits associated with the respective first and second actuators.

10. The method of claim 7, comprising implementing the upper operational limit associated with the first actuator as the upper operational limit for the second actuator based on the first actuator reaching its upper operational limit.

11. The method of claim 7, comprising implementing the upper operational limit associated with the second actuator as the upper operational limit for the first actuator based on the second actuator reaching its upper operational limit.

12. The method of claim 7, comprising implementing the lower operational limit associated with the first actuator as the lower operational limit for the second actuator based on the first actuator reaching its lower operational limit.

13. The method of claim 7, comprising implementing the lower operational limit associated with the second actuator as the lower operational limit for the first actuator based on the second actuator reaching its lower operational limit.

14. A control system for managing operational limits associated with two or more actuators, comprising:
a controller continually monitoring:
an upper operational limit associated with a first actuator;
an upper operational limit associated with a second actuator;
a lower operational limit associated with the first actuator; and
a lower operational limit associated with the second actuator; and
wherein the controller determines one or more system operating limits based on the upper and lower operational limits of the respective first and second actuators, wherein the controller implements one or more of the system operating limits in the first actuator and in the second actuator in a manner where asymmetric operation is prohibited once one or more of the system operating limits is reached.

* * * * *